J. W. YOUNG.
DRILL ROD GRAB.
APPLICATION FILED DEC. 13, 1911.
1,048,630.
Patented Dec. 31, 1912.
3 SHEETS—SHEET 3.
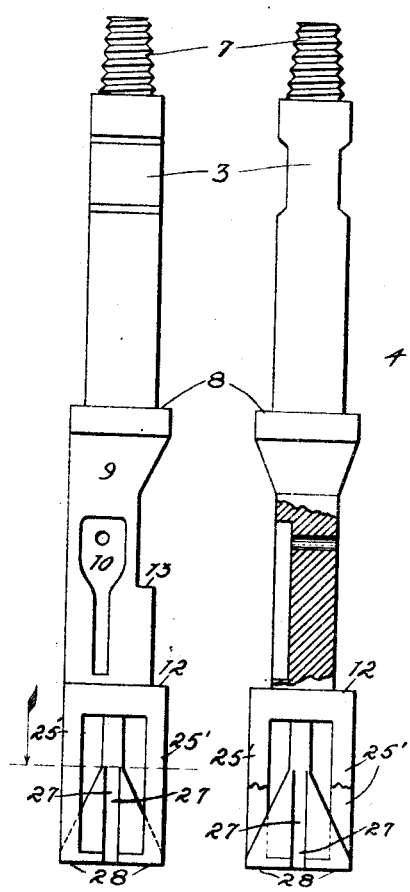

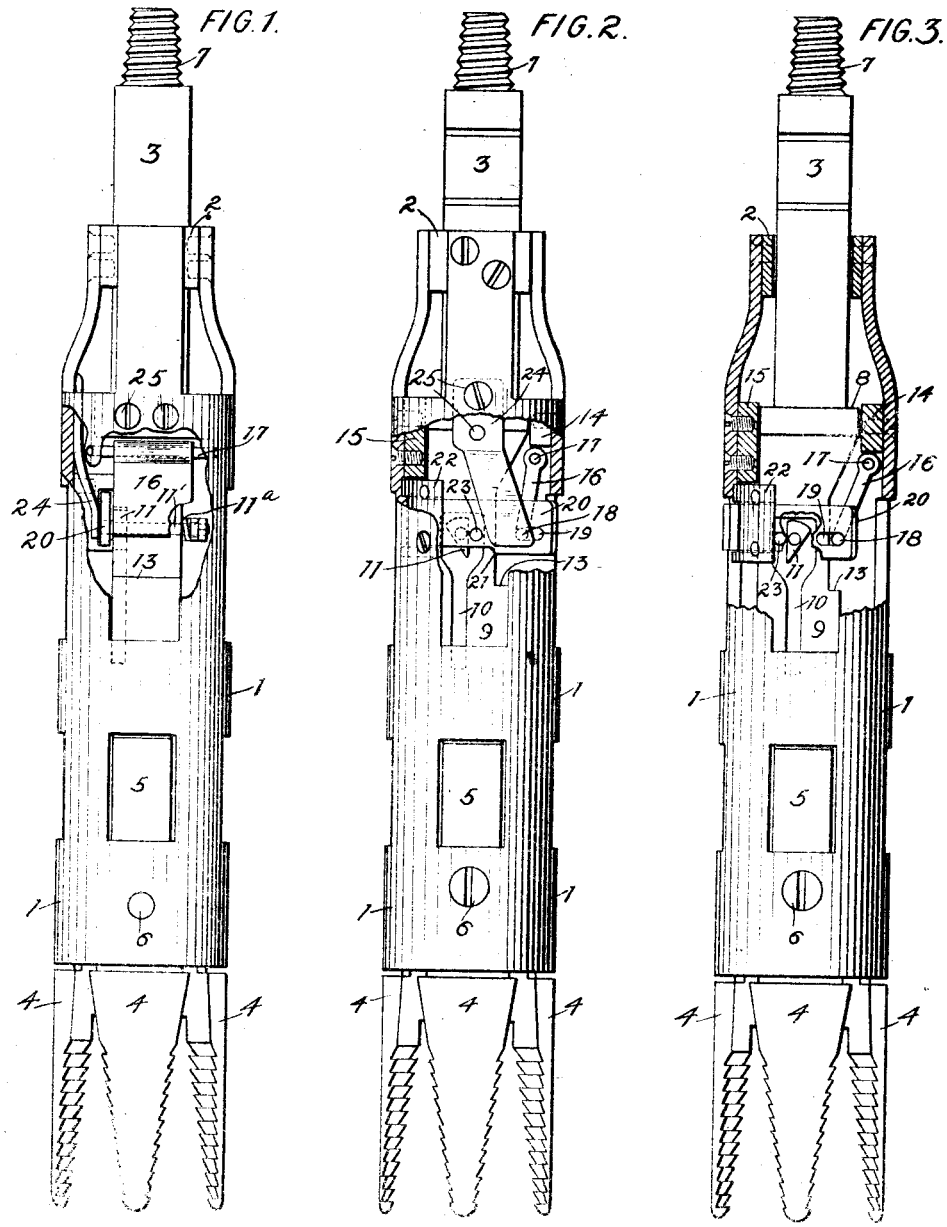

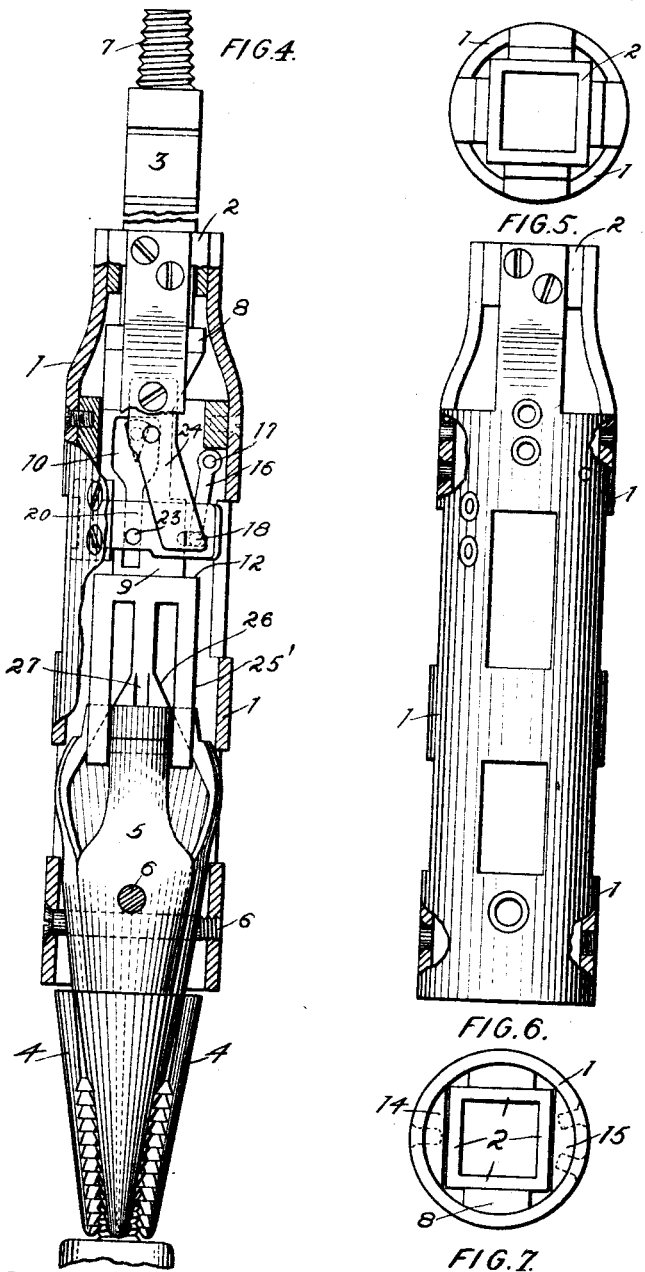

UNITED STATES PATENT OFFICE.

JAMES W. YOUNG, OF FULLERTON, CALIFORNIA.

DRILL-ROD GRAB.

1,048,630.　　　　Specification of Letters Patent.　　Patented Dec. 31, 1912.

Application filed December 13, 1911. Serial No. 665,468.

*To all whom it may concern:*

Be it known that I, JAMES W. YOUNG, a citizen of the United States, residing at Fullerton, in the county of Orange and State of California, have invented certain new and useful Improvements in Drill-Rod Grabs, of which the following is a specification.

This invention relates to improvements in devices for recovering lost tools in oil wells and the like and its object is to produce a device of this class adapted to grasp a tool or object that may be wedged in the well at any point above the bottom thereof or that may be resting upon the bottom; the construction of the device is such that when a purchase upon the lost tool or article is obtained the same can be released and again obtained as many times as desired or as may be necessary. Lost tools or portions thereof may be lodged in the well or upon the bottom thereof in an inclined position with one end resting against the wall of the well so that no ordinary grab device could be slipped over the end thereof, but my improved device is adapted to obtain a purchase upon the body of the tool and to jar or move the same until it can be dislodged or so positioned that a purchase upon its end may be obtained.

A complete description of the device is to be had in the following specification, pointed out in the claims and illustrated in the accompanying drawings which form a part of the specification and in which—

Figure 1 is a side elevation of my improved device with the stem depressed and jaws open. Fig. 2 is a front elevation partly in section with stem depressed and stop plate inoperative. Fig. 3 is a front elevation, partly in section, with stop plate operative. Fig. 4 is a front elevation of the device, in section, with the stem raised, and jaws closed. Fig. 5 is a top plan. Fig. 6 is a front elevation of the shell. Fig. 7 is a bottom plan with mechanism removed except guide blocks. Fig. 8 is a front elevation of the stem. Fig. 9 is a side elevation of the same partly in section. Figs. 10, 11 and 12 are views of one of the jaws in three positions. Figs. 13 to 26 inclusive are details.

Like reference characters indicate corresponding parts throughout the several views.

1 is the shell or casing of the tool preferably formed with the several openings as shown more for lightness than anything else; the upper end of the casing terminates in a neck 2, square in horizontal section and through which and into the casing the stem 3 projects. To the lower end of the casing a plurality of tapered jaws 4, made integral with connections 5 that are pivotally secured to the casing by screws 6 or other fastening means, are secured. The jaws 4 lie wholly outside the casing and are therefore not hampered in their operations which consist of opening and closing in a manner hereinafter described and so that gravity will keep them open. The upper end of the stem 3 is threaded as at 7 for connection with the lifting mechanism, not shown, and the body of the said stem is provided with integral shoulders 8 that come in contact with the neck 2 of the tool when the stem is drawn upward and prevent withdrawal of the same from the casing.

Upon the front face of the stem 3, which is the face partly shown in Figs. 2, 3 and 4 and shown in full in Fig. 8, a portion 9 is formed below the shoulder 8 and the same is provided with a slot 10 as shown and in this slotted portion of the portion 9 a finger 11 is disposed upon a pivot 11′ that enters the stem and is provided with a friction spring 11ª, a washer and a nut. The portion 9 is the front face of part of the stem and extends from the shoulder 8 to a shoulder 12 formed upon the front and rear and one of the side faces of the stem. The side face of the stem wherein the shoulder 12 is formed, which is the side face illustrated in Fig. 1, is formed with an intermediate shoulder 13 between the shoulders 8 and 12 and this shoulder is likewise formed in the portion 9.

14 and 15 are guides secured to the inner surface of the casing between which the stem 3 oscillates.

16 is a stop plate pivoted within the casing upon a pin 17, the ends of which lie in the said casing, and disposed opposite a side face thereof adapted for contact with the shoulder 13 of the adjacent face of the stem. A lug 18 is made integral with the stop plate 16 for engagement with the slotted portion 19 of a sliding plate 20 whereby one end of this plate is supported; the lower horizontal edge of this plate is formed with a shoulder 21 and the narrow end of the plate is mounted in a recessed guide 22 secured to the inner surface of the casing. The plate 20 is further provided with a pin 23 that projects inwardly into the recessed portion 10 of the stem and which serves as a stop for the plate 20 when it comes in contact with one inner edge of the portion 9 of said stem; the said pin 23 is also adapted for contact with the point of finger 11 when this finger after having been raised by the stem 3 above the pin 23 descends. Should the point of finger 11 chance to be inserted as a wedge between the pin 23 and the adjacent inner edge of the portion 9 the plate 20 will be slid away from the guide 22 drawing plate 16 with it but should the finger 11 descend upon the opposite side of this pin 23 it will force the plate 20 in the opposite direction or in a direction toward guide 22.

24 is a guide plate secured by screws 25 to the casing and its lower extremity is projected inwardly to serve as a guide for the plate 20 and to keep the same in engagement with the lug 18 of stop plate 16 and it (guide plate 24) is disposed adjacent the front face of the stem.

Below the point of the shoulders 12 upon the stem the same is made square in horizontal section as shown in Figs. 18 and 19 and part of its central portion is cut away, thereby forming legs 25' and a core 26 disposed between the said legs and provided with vertically disposed recesses 27; the said core extending from near the upper extremities of the legs to the ends thereof and the recesses extending beyond the legs and through the base 28 of the stem. The four corners of the base 28 are each adapted to removably reside in a seated-out portion 29 of one of the jaw connections 5 at the base of the curved walls 30 of that connection which walls are separated by a rib 31 adapted for engagement with the recessed cores.

Operation: When pressure is exerted upon the upper end of the stem 3 the base of the stem is pressed against the seats 29 thus forcing the jaws 4 apart. If the stem in descending to the seats 29 caused the finger 11 to wedge itself between the pin 23 of plate 20 and the adjacent inner edge of the stem-portion 9 the sliding plate 20 will have been forced toward the guide 22 drawing with it the pivoted stop plate 16 which will prevent the shoulder 13 being drawn above the lower horizontal edge of the said stop plate. In this position the base of the stem 3 will be retained a short distance above the seats 29 in the widest part of the curved walls 30 of the jaw connections and in this position the jaws 4 are locked open. To close the jaws the stem must be reciprocated until the finger 11 is worked down upon the opposite side of the pin 23 thus forcing the sliding plate 20 with stop plate 16 in a direction away from the guide 22 so that the shoulder 13 of the stem 3 may pass the said stop plate 16 and the stem withdrawn the maximum distance out of the casing or until the shoulder 8 of the stem rides against the neck 2 of the casing; the base of the stem will now reside in the upper end of the curved walls 30 of the jaw connections thus forcing the connections apart and bringing the jaws 4 together tightly. The jaws are placed over the lost tool while in their open position and when in engagement with the same the operation last described is performed thus causing the device to obtain a purchase upon the end of the tool. The jaws 4 are so constructed with teeth disposed in three planes on each jaw that a purchase may be had upon the end or body of most any object and a purchase upon the body portion will be sufficient to dislodge the object in all events and work it into an upright position when the jaws can be slipped over the end of the same and the object withdrawn.

What is claimed is:—

1. In a device of the class described, a casing formed with a neck at one extremity, a stem slidably secured within said casing partially hollowed above its base and provided with a plurality of stop shoulders and with a slotted front face, a finger pivotally carried by said stem and disposed within the slotted portion of its front face, a recessed guide secured within said casing, a stop plate pivotally disposed within said casing, a lug made integral with said stop plate, means secured to said lug partially disposed within the said recessed guide operable through the medium of the said finger, jaws disposed wholly outside the casing made integral with connections pivotally secured within said casing, the said jaw connections each being formed with curved walls capable of jaw-locking engagement with the base of the aforesaid stem, a rib between said walls and means disposed within the hollowed portion of said stem for cooperation with the said rib.

2. In a device of the class described, a casing formed with a neck at one extremity, a stem slidably secured within said casing provided with a plurality of stop shoulders and with a slotted front face, a finger pivotally carried by said stem and disposed within the slotted portion of its front face, a recessed guide secured within said casing, a stop plate pivotally disposed within said casing, a lug made integral with said stop plate, means secured to said lug partially disposed within the said recessed guide operable through the medium of the said finger, a recessed core formed within said stem, jaws disposed wholly outside the casing made integral with connections pivotally secured within the said casing, the said jaw connections each being formed with curved walls capable of jaw-locking engagement with the base of the aforesaid stem, and a rib for coöperation with the aforesaid recessed core.

3. In a device of the class described, a casing formed with a neck at one extremity, a stem slidably secured within said casing provided with a plurality of stop shoulders and with a slotted front face, a finger pivotally carried by said stem and disposed within the slotted portion of its front face, a recessed guide secured within said casing, a slotted sliding plate disposed partly within said guide operable by said finger, stop means pivotally disposed within the casing capable of engagement with one of the shoulders of the said stem and operably connected to the said slotted sliding plate, a recessed core formed within said stem, jaws disposed wholly outside the casing made integral with connections pivotally secured within the said casing, the said jaw connections each being formed with curved walls capable of jaw-locking engagement with the base of the aforesaid stem, and a rib between said walls for coöperation with the aforesaid recessed core.

4. In a device of the class described, a casing formed with a neck at one extremity, a stop plate pivotally disposed within said casing, a lug made integral with said stop plate, a stem slidably secured within said casing provided with a plurality of stop shoulders one of which is capable of engagement with the said stop plate and with a slotted front face, a finger pivotally carried by said stem and disposed within the slotted portion of its front face, a guide, a slotted sliding plate operable by said finger disposed partly within said guide and connected to the aforesaid stop plate, a recessed core formed within said stem, jaws disposed wholly outside the casing made integral with connections pivotally secured within the said casing, the said jaw connections each being formed with curved walls capable of jaw-locking engagement with the base of the aforesaid stem and a rib between said walls for coöperation with the aforesaid recessed core.

In testimony that I claim the foregoing as my own I have hereto affixed my signature in the presence of two subscribing witnesses.

JAMES W. YOUNG.

Witnesses:
FRANK M. FOX,
EDWARD E. BALCOM.